United States Patent [19]

Yard et al.

[11] 4,003,253
[45] Jan. 18, 1977

[54] MULTI-RANGE VORTEX-SHEDDING FLOWMETER

[75] Inventors: John S. Yard, Doylestown; Peter J. Herzl, Morrisville; Daniel Evans, Feasterville, all of Pa.

[73] Assignee: Fischer & Porter Co., Warminster, Pa.

[22] Filed: Sept. 8, 1975

[21] Appl. No.: 611,170

[52] U.S. Cl. .......................................... 73/194 VS
[51] Int. Cl.[2] ........................................ G01F 1/32
[58] Field of Search ............... 73/194 VS, 194 B; 138/44, 45

[56] References Cited
UNITED STATES PATENTS

| | | | |
|---|---|---|---|
| 1,935,445 | 11/1933 | Heinz | 73/194 |
| 3,116,639 | 1/1964 | Bird | 73/194 |
| 3,147,618 | 9/1964 | Benson | 73/204 |
| 3,698,245 | 10/1972 | McNabb | 73/194 |
| 3,724,503 | 4/1973 | Cooke | 138/45 |
| 3,874,234 | 4/1975 | Burgess | 73/194 |

*Primary Examiner*—Herbert Goldstein

[57] ABSTRACT

An adapter for a vortex-shedding flowmeter serving to render the meter capable of measuring low flow rates below its normal operating range. The flowmeter includes a flow tube forming a passage for the fluid to be measured and an obstacle assembly mounted therein for generating fluidic oscillations which frequency is proportional to flow rate. The adapter includes means that act to restrict the effective area of the fluid traversing the obstacle assembly, whereby for the same velocity of flow past the assembly a smaller amount of fluid is metered. By providing a set of adapters introducing different areas of restriction, the meter is then able to function as a multi-range instrument.

6 Claims, 5 Drawing Figures

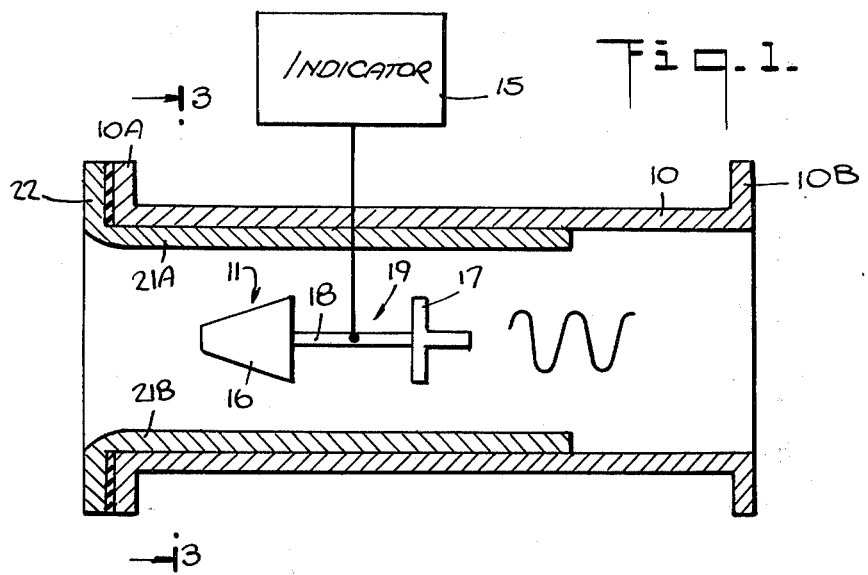
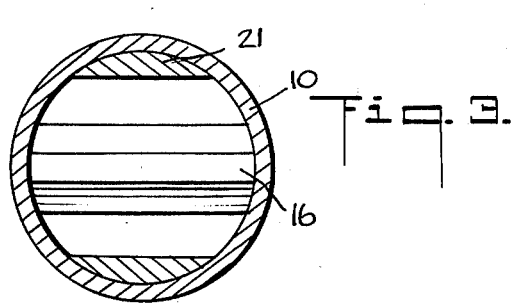
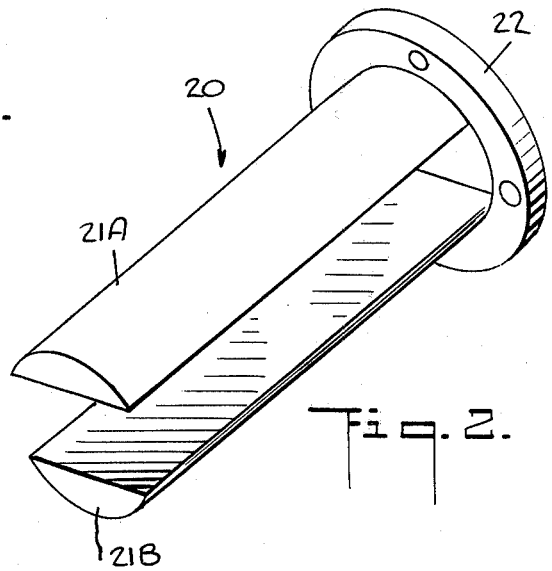
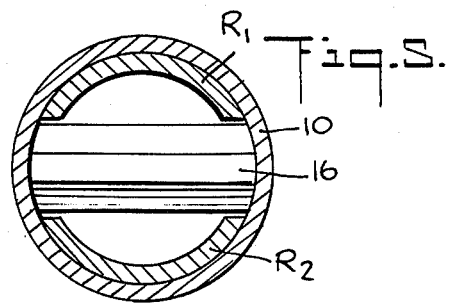
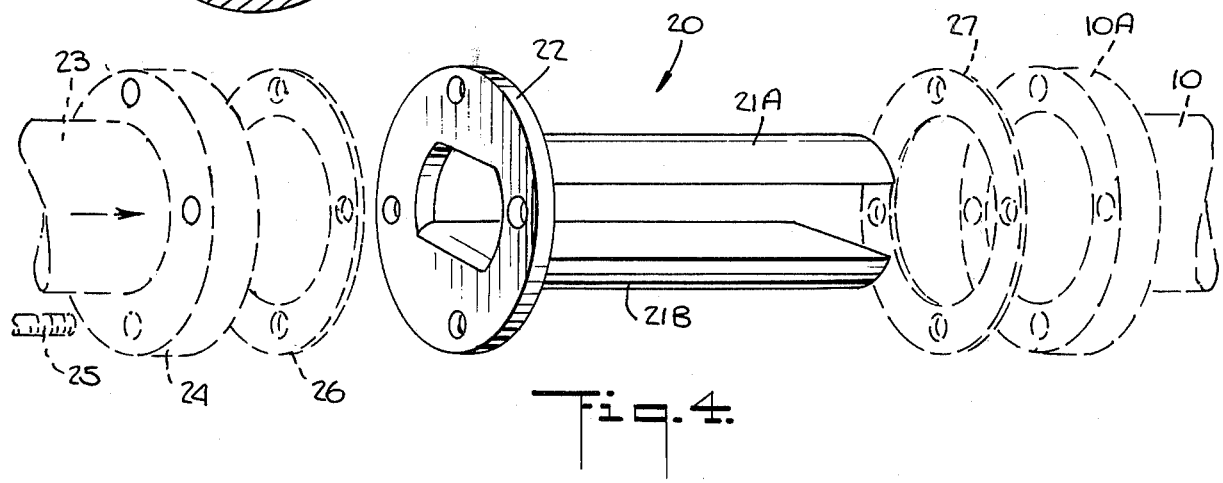

4,003,253

MULTI-RANGE VORTEX-SHEDDING FLOWMETER

BACKGROUND OF INVENTION

This invention relates generally to flowmeters of the vortex type, and more particularly to adapters for a flowmeter to reduce the effective area of fluid passing the vortex shedding body, thereby making it possible for the meter to measure flow rates below its normal operating range.

It is well known that under certain circumstances the presence of an obstacle in a flow conduit will give rise to periodic vortices. For small Reynolds numbers, the downstream wake is laminar in nature, but at increasing Reynolds numbers, regular vortex patterns are formed. These patterns are known as Karman vortex streets. The frequency at which vortices are shed in a Karman vortex street is a function of flow rate, this phenomenon being exploited to create a flowmeter. Flowmeters of the vortex-shedding type are disclosed in U.S. Pat. Nos. 3,116,639 and No. 3,572,117, among others.

U.S. Pat. No. 3,589,185 describes an improved form of vortex-type flowmeter wherein the signal derived from the fluidic oscillation is relatively strong and stable to afford a favorable signal-to-noise ratio, insuring accurate flowrate information over a broad range. In this meter, an obstacle assembly is mounted in the flow tube, the assembly being constituted by a block positioned across the tube with its longitudinal axis at right angles to the direction of fluid flow, a strip being similarly mounted across the conduit behind the block and being spaced therefrom to define a gap which serves to trap Karman vortices and to strengthen and stabilize the vortex street. This street is sensed by a pressure or other form of transducer to produce an electrical signal whose frequency is proportional to flow rate.

A typical vortex-shedding flowmeter of known design includes a flow tube having mounting flanges at the ends thereof. One mounting flange is bolted or otherwise attached to the complementary flange on an upstream pipe section of the pipeline carrying the fluid whose rate is to be metered, the other mounting flange being attached to the complementary flange of the downstream pipe section. A conventional vortex-shedding flowmeter has a fixed metering range within which it is capable of accurately measuring flow rate. This range is largely determined by linearity requirements, signal recovery parameters and internal velocity limitations.

In some instances, it becomes necessary to accurately measure low flow velocities, which lies below the normal operating range of a standard vortex-type meter. With existing meters, it is not possible, in the field, to alter the operating range of an installed meter. Moreover, it is difficult to produce a small capacity flowmeter, for with existing vortex-shedding meter structures, the vortex-sensing system cannot economically be miniaturized.

SUMMARY OF INVENTION

In view of the foregoing, the main object of the present invention is to provide an adapter for a standard vortex-shedding flowmeter, which adapter, when applied to the meter, renders it capable of measuring low flow velocities below the normal operating range thereof.

More specifically, it is an object of the invention to provide an adapter of the above type which acts to restrict the effective areas of fluid traversing the vortex-shedding body, whereby for the same velocity of flow past the shedding body, a smaller amount of fluid is metered.

A significant feature of the invention is that by means of adapters of different size one can readily change the operating range of the meter in the field without, however, adversely affecting the linearity of the meter.

Yet another object of the invention is to provide a low-cost adapter for a vortex-shedding meter which can be quickly installed and which operates reliably.

Briefly stated, these objects are accomplished by adapters for a vortex shedding flowmeter which includes a flow tube forming a passage for the fluid to be measured and an obstacle assembly mounted therein for generating fluidic oscillations whose frequency is proportional to flow rate. Each adapter includes means cooperating with the flow tube serving to restrict the effective area of the fluid traversing the obstacle assembly. By providing adapters introducing different areas of restriction to the meter, the meter is then capable of functioning as a multi-range instrument.

OUTLINE OF DRAWING

For a better understanding of the invention as well as other objects and further features thereof, reference is made to the following detailed description to be read in conjunction with the accompanying drawings, wherein:

FIG. 1 is a longitudinal section taken through a preferred embodiment of a vortex-type flowmeter having an adapter therein in accordance with the invention;

FIG. 2 is a separate view of the adapter which is shown in perspective;

FIG. 3 is a transverse section taken in the plane indicated by line 3—3 in FIG. 1;

FIG. 4 illustrates how the adapter is installed; and

FIG. 5 is a section taken through another embodiment of an adapter for a vortex-type meter.

DESCRIPTION OF INVENTION

The Meter

Referring now to the drawing and more particularly to FIGS. 1 to 3, there is shown a known form of flowmeter of the vortex-shedding type, the meter comprising a flow tube 10, an obstacle assembly generally designated by numeral 11, mounted within the assembly, and a sensor 12, which may be constituted by strain gauges, supported by the assembly. Flow tube 10 is provided with mounting flanges 10A and 10B at either end thereof, whereby the meter may be interposed within a flow line, with the respective mounting flanges thereof bolted to the complementary flanges of upstream and downstream pipes.

Flow tube 10 has a circular cross-section and includes an inlet into which a fluid to be metered is introduced. The incoming fluid impinges on obstacle assembly 11 which acts to divide the flow around the obstacle, the assembly producing fluidic perturbations in the form of a Karman vortex street. The nature of this phenomenon is explained in the text by Schlichtling, "Boundary Layer Theory" (McGraw-Hill—1960).

The resultant fluidic oscillations in the downstream wake, roughly represented by trace line 14, are sensed by the strain gauge or whatever other sensor 12 is used to produce an electrical signal. The sensor signal is applied to a suitable indicator or recorder 15 to provide flow rate readings.

Obstacle assembly 11 is formed by a front section 16 and a rear section 17 mounted behind the front section by a cantilever support 18, which may be constituted by a pair of resilient pins. Front section 16 is a contoured block having a triangular or delta-shaped cross-section which is uniform throughout the longitudinal axis of the block, this axis being perpendicular to the flow axis of the flow tube. The ends of the front section are secured to the wall of the flow tube whereby the front section is fixedly held within the conduit.

The apex of the block faces the incoming fluid, the inclined sides thereof forming leading edges which are swept by the flow of fluid to create vortices. The invention is not limited to obstacle bodies of this shape, for the obstacle may take other shapes such as those disclosed in U.S. Pat. No. 3,589,185.

Rear section 17 takes the form of a non-streamlined body which in this embodiment is in strip form and is maintained by cantilever support 18 in spaced relation to the front section, the plane of the strip being parallel to the flat base of the block. The rear section shape is such as to interfere with the vortex street, the cavity or gap 19 created between the front section and the rear section tending to trap the vortices and to strengthen and stabilize the vortex street produced thereby.

Because rear section 17 is cantilevered by means of resilient pins, it is deflectable. The pins, though functioning as tines, have sufficient rigidity so as to permit only a slight deflection of the rear section. As a consequence of the fluidic oscillations produced within the conduit, the rear section is excited into vibration at a rate corresponding to the frequency of the oscillations. The natural resonance of the deflectable rear section is such as to be well outside the normal frequency range of the meter, whereby mechanical resonance peaks are absent and the amplitude of the vibrating motion accurately reflects the amplitude of the fluidic oscillations. Because the deflectable system is relatively rigid, the total excursion of the rear section is minute, even at the highest amplitudes of fluidic oscillation, so that metal fatigue of the supporting pins, as a result of the vibrating action, is minimized and failures do not arise after prolonged operation.

It is important to note that the magnitude of deflection is not of primary importance, for the flow rate information is given by the frequency, not the amplitude of vibration. Hence while the deflection magnitude is made extremely small in order to provide an acceptable fatigue life, this does not militate against a readable output of varying frequency.

From the basic Strouhal Number relationship for vortex shedding bodies, the oscillation frequency is approximately equal to 0.22 (V/D), where V is the velocity past the body and D is the body width.

The strain gauges extend between the front and rear sections along the support pins and are periodically stressed as the deflectable rear section undergoes vibration to produce corresponding changes in resistance. By connecting the two strain gauges in series in a bridge circuit, the periodic change in resistance is converted into an electrical signal whose frequency is proportional to flow rate. Such gauges make use of a wire or grid whose electrical resistance is caused to change as a function of the strain imposed thereon, for when a wire is stretched, its length and diameter are altered with a resultant change in its ohmic value. Alternatively, one may make use of semi-conductor, solid-state strain gauges. In practice, one may use a single gauge to provide a signal representing flow rate. A preferred form of sensor is a piezoelectric crystal or electrostrictive detector which is disposed in or on the pins in a manner whereby the crystal is periodically stressed to produce an output signal whose frequency is proportional to flow rate. The particular type of obstacle assembly used in the meter and the nature of the sensor form no part of the present invention, but are described only for purposes of background, in that the adapter is usable with any known type of vortex-shedding flowmeter.

Adapter (First Embodiment)

As shown in FIGS. 1 and 2, the adapter in accordance with the invention, generally designated by numeral 20, is constituted by a pair of solid rods 21A and 21B having the form of a segment of a cylinder. To facilitate insertion of the rods within flow tube 10 of the meter, the rods are secured at their flow input ends to a mounting flange 22 whose dimensions conform to mounting flange 10A of the flow tube. Thus when the rods are inserted within the flow tube, flange 22 lies against flange 10A, a gasket being sandwiched therebetween in a manner to be later described.

The cylindrical form from which rods 21A and 21B are derived matches the cylindrical passage within flow tube 10. Rods 21A and 21B are so oriented with respect to each other that their planar surfaces lie in parallel relation, the rods occupying diametrically-opposed positions within the flow passage above and below block 16 of the obstacle assembly. The rods are preferably formed of a metal or plastic material of high strength which is non-reactive with the fluid being metered.

Thus the flow passage, which normally has a circular cross-section, is reduced in area by the rods to define a restricted flow passage having a generally rectangular cross-section. The extent of restriction depends, of course, on the geometry of the rods inserted in the passage. By providing rods which represent larger segments of the cylindrical form, one can create a greater restriction in the passage.

Rods 21A and 21B serve to reduce the flowmeter capacity by restricting the effective area of liquid or gas passing the vortex-shedding obstacle assembly 11. Thus for the same velocity of flow past the shedding body, a smaller amount of fluid is metered, thereby making the meter responsive to flow rates below its normal operating range.

By providing for the meter a set of such adapters with rods of different cross-sectional dimensions, it becomes possible to effect a series of changes in the effective range of the meter, so that the set of adapters in conjunction with the meter produces a multi-range vortex-shedding meter, rather than a meter having a fixed operating range set by the diameter of the flow tube.

The inlet ends of rods 21A and 22B are chamfered or rounded to avoid an abrupt change in the cross-sectional area of the flow passage, thereby affording a smooth transition in flow between the upstream pipe section to which the meter is coupled and the connecting passage in the flow tube which is of reduced area. This converging inlet avoids turbulence or undue interference with the velocity profile of the fluid entering the flow tube.

It has been found, moreover, that the generally rectangular cross-sectional form of the restricted passage improves the shedding characteristics of the shedding body, for this body now reacts with the parallel planar walls of the rods which provide a flow passage of uniform width, rather than with the normally arched walls of the flow tube which create with respect to the shedding body a passage of non-uniform width.

Installation of Adapter

In its normal installation, the vortex-shedding flowmeter is interposed between an upstream pipe section and a downstream pipe section of a flow line, the mounting flanges 10A and 10B of the meter being bolted to the complementary flanges of these pipe sections.

FIG. 4 only shows the upstream pipe section 23 of this line and its mounting flange 24. The mounting flange 22 of the adapter 20 is interposed between flange 24 of the pipe section and flange 10A of the meter, the three flanges being bolted together by bolts 25 passing through registered bores in the three flanges. A sealing gasket 26 is sandwiched between flanges 24 and 22 and a sealing gasket 27 is sandwiched between flanges 22 and 10A to provide a leak-proof joint. Thus it becomes a simple matter in the field to install an adapter in the meter. The bores in the adapter flange serve to ensure proper orientation of the rods inserted in the flow tube.

Adapter (Second Embodiment)

It is to be noted that while the adapter, in its preferred form, introduces rods extending longitudinally within the flow tube to restrict the area of the passage therein, a restriction may be created by an orifice plate attached to the inlet of the flow tube. But such an abrupt restriction would create turbulence in the incoming flow and degrade somewhat the performance of the meter.

In the adapter shown in FIG. 3, the restriction in the passage is created by a pair of rods $R_1$ and $R_2$ formed by arcuate pipe sections whose dimensions are such that they conform to the contour of the inner wall of the flow tube, thereby restricting the flow passage to an extent determined by the thickness of these sections without, however, altering the cross-sectional configuration of the passage. Thus the rods reduce the effective diameter of the circular passage. By providing a set of such adapters of different size, one is able to change the range of the meter to create a multi-range flowmeter.

While there have been shown and described preferred embodiments of a multi-range vortex-shedding flowmeter in accordance with the invention, it will be appreciated that many changes and modifications may be made therein without, however, departing from the essential spirit thereof. For example, instead of inserting the rods within the flow tube by means of a supporting flange, the rods may be held therein by other means, such as by screws passing through bores in the wall of the flow tube.

We claim:

1. A replaceable adapter for a vortex-shedding flowmeter provided with a flow tube forming a cylindrical passage through which the fluid to be metered is conducted, said tube having a mounting flange at the inlet thereof, and an obstacle assembly mounted within the tube to create vortices whose frequency is a function of flow rate, said obstacle assembly including a block mounted cross the tube at right angles to the direction of flow, said adapter comprising a pair of rods disposed longitudinally in said flow tube on opposite sides of said block to restrict the effective area of said passage, whereby said meter is responsive to flow rates which lie below the normal operating range of the meter, said rods being cantilevered from a support flange lying against said mounting flange.

2. An adapter as set forth in claim 1, wherein the flow inlet end of said rods is curved to prevent an abrupt transition in the effective area.

3. An adapter as set forth in claim 1, wherein said passage has a circular cross-section.

4. An adapter as set forth in claim 3, wherein said rods are segments of a cylinder which matches the diameter of the cylindrical passage, the planar surfaces of said rods lying in parallel relation to form a restricted passage having a generally rectangular cross-section.

5. An adapter as set forth in claim 3, wherein said rods are arcuate sections of round pipe which conform to the inner wall of the tube.

6. An adapter as set forth in claim 1, wherein said rods are fabricated of a material non-reactive with the fluid being metered.

* * * * *